United States Patent [19]

Hong

[11] Patent Number: 5,613,659
[45] Date of Patent: Mar. 25, 1997

[54] SUCTION DEVICE WITH SHEET-PRESSING ABILITY

[76] Inventor: Chu-Chai Hong, 6F, No. 125, Sec. 5, Roosevelt Rd., Taipei City, Taiwan

[21] Appl. No.: 436,994

[22] Filed: May 8, 1995

[51] Int. Cl.⁶ .................................................. A45D 42/14
[52] U.S. Cl. .................................. 248/205.5; 248/205.7; 248/205.8; 248/363
[58] Field of Search .............................. 248/205.5, 205.6, 248/205.7, 205.8, 206.2, 206.1, 362, 363

[56]  References Cited

U.S. PATENT DOCUMENTS

| 993,989 | 5/1911 | Hazelrigg | 248/205.7 |
|---|---|---|---|
| 1,000,858 | 8/1911 | Ulrich | 248/205.7 |
| 1,466,961 | 9/1923 | Prim | 248/205.7 |
| 1,632,856 | 6/1927 | Running | 248/205.5 |
| 2,886,277 | 5/1959 | Boham et al. | 248/205.5 |
| 5,087,005 | 2/1992 | Holoff et al. | 248/205.8 |

FOREIGN PATENT DOCUMENTS

| 1016325 | 11/1952 | France | 248/205.7 |
|---|---|---|---|
| 608281 | 9/1960 | Italy | 248/205.7 |

Primary Examiner—Alvin C. Chin-Shue
Assistant Examiner—Anita M. King
Attorney, Agent, or Firm—Skjerven, Morrill, MacPherson, Franklin & Friel; Alan H. MacPherson; Thomas S. MacDonald

[57] ABSTRACT

A suction device includes a suction cup and a flexible hanging member attached to the suction cup. The suction cup has a pivot unit projecting integrally therefrom and a periphery located in a plane which is spaced from the pivot unit at a predetermined distance. The hanging member includes a socket unit which receives rotatably the pivot unit therein and which exposes the suction cup to an exterior of the socket unit, and a plurality of pressing claws connected securely to the socket unit. Each of the pressing claws has a planar abutting surface which is substantially parallel to the plane and which is spaced apart from the pivot unit at a distance that is larger than the predetermined distance. The socket unit is generally U-shaped and is provided with a pair of tongues which permit entry of the pivot unit into the socket unit and which prevents removal of the pivot unit therefrom.

4 Claims, 6 Drawing Sheets

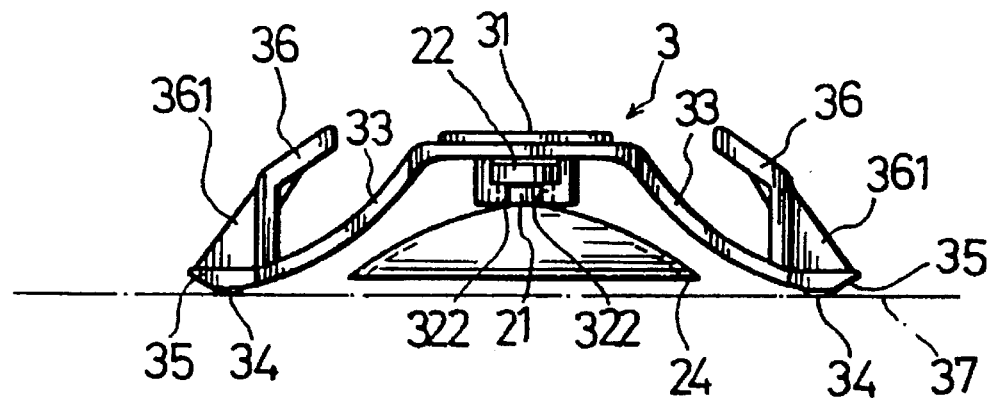
F I G. 4
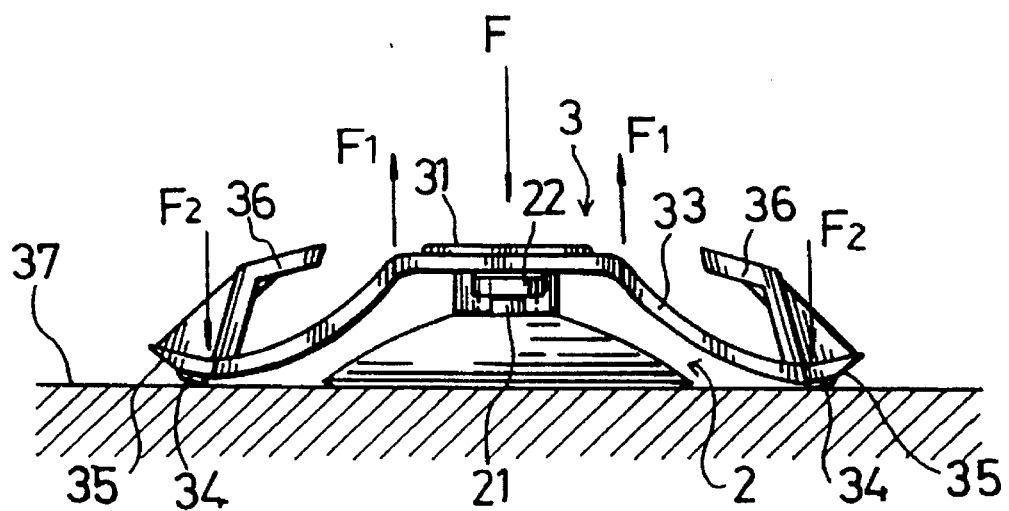
F I G. 5

5,613,659

SUCTION DEVICE WITH SHEET-PRESSING ABILITY

BACKGROUND OF THE INVENTION

1. Field of the Invention

The invention relates to a suction device, more particularly to a suction device with a sheet-pressing ability.

2. Description of the Related Art

FIG. 1 shows a conventional suction device 10 which includes a suction cup 11 with a suction face 111 that is adapted to be pressed against a smooth surface 13 so as to stick thereon, a non-suction face 112 that is opposite to the suction face 111, and a support protrusion 113 that projects integrally from the non-suction face 112. A hook 12 is attached securely to the protrusion 113 so that an object can be hung on the suction device 10.

Some of the drawbacks resulting from the use of the conventional suction device 10 are as follows:

(I) Although the conventional suction device 10 permits hanging of an object thereon, the suction device 10 cannot be used to press a sheet of paper against the smooth surface 13, thereby resulting in limited use thereof.

(II) Since the suction force which causes the suction cup 11 to stick on the smooth surface 13 is limited, the suction cup 11 may drop from the smooth surface 13 in the event that a relatively heavy object is hung on the hook 12.

(III) The conventional suction device does not include an additional element for strengthening the suction force of the suction cup 11 when in use.

SUMMARY OF THE INVENTION

Therefore, an objective of the present invention is to provide a suction device which has a sheet-pressing ability in addition to hanging of objects thereon.

Another objective of the present invention is to provide a suction device which has a suction force that is stronger than that of a conventional suction device so that a heavier object can be borne by the suction device of the present invention.

Accordingly, the suction device of the present invention includes a suction cup and a flexible hanging member. The suction cup has a suction face, a non-suction face opposite to the suction face, a pivot unit which projects integrally from a center of the non-suction face, and a periphery which is located in a plane that is spaced from the pivot unit at a predetermined distance. The hanging member includes a socket unit which receives rotatably the pivot unit in such a manner that the suction cup is exposed to an exterior of the socket unit, and a plurality of pressing claws connected securely to the socket unit. Each of the pressing claws has an abutting surface which is substantially parallel to the plane and which is spaced apart from the pivot unit at a distance that is larger than the predetermined distance, and a mounting surface opposite to the abutting surface. Each of the pressing claws further has a hook attached to the mounting surface for hanging an object thereon.

The suction cup can be pressed against a smooth surface so as to stick the suction device on the smooth surface in such a manner that the pressing claws of the hanging member flex and that the abutting surfaces of the pressing claws are pressed against the smooth surface. Under this condition, a sheet of paper can be clamped between the abutting surface of one of the pressing claws and the smooth surface, and an object can be hung on the hook of one of the pressing claws.

BRIEF DESCRIPTION OF THE DRAWINGS

Other features and advantages of the present invention will become more apparent in the following detailed description of the preferred embodiments with reference to the accompanying drawings, in which:

FIG. 4 shows the suction device of the present invention, illustrating the position of the suction cup relative to the hanging member of the suction device before the suction cup is pressed on a smooth surface;

FIG. 5 shows the suction device of the present invention, illustrating how the suction device is stuck on a smooth surface;

DETAILED DESCRIPTION OF THE PREFERRED EMBODIMENTS

Figure 1:
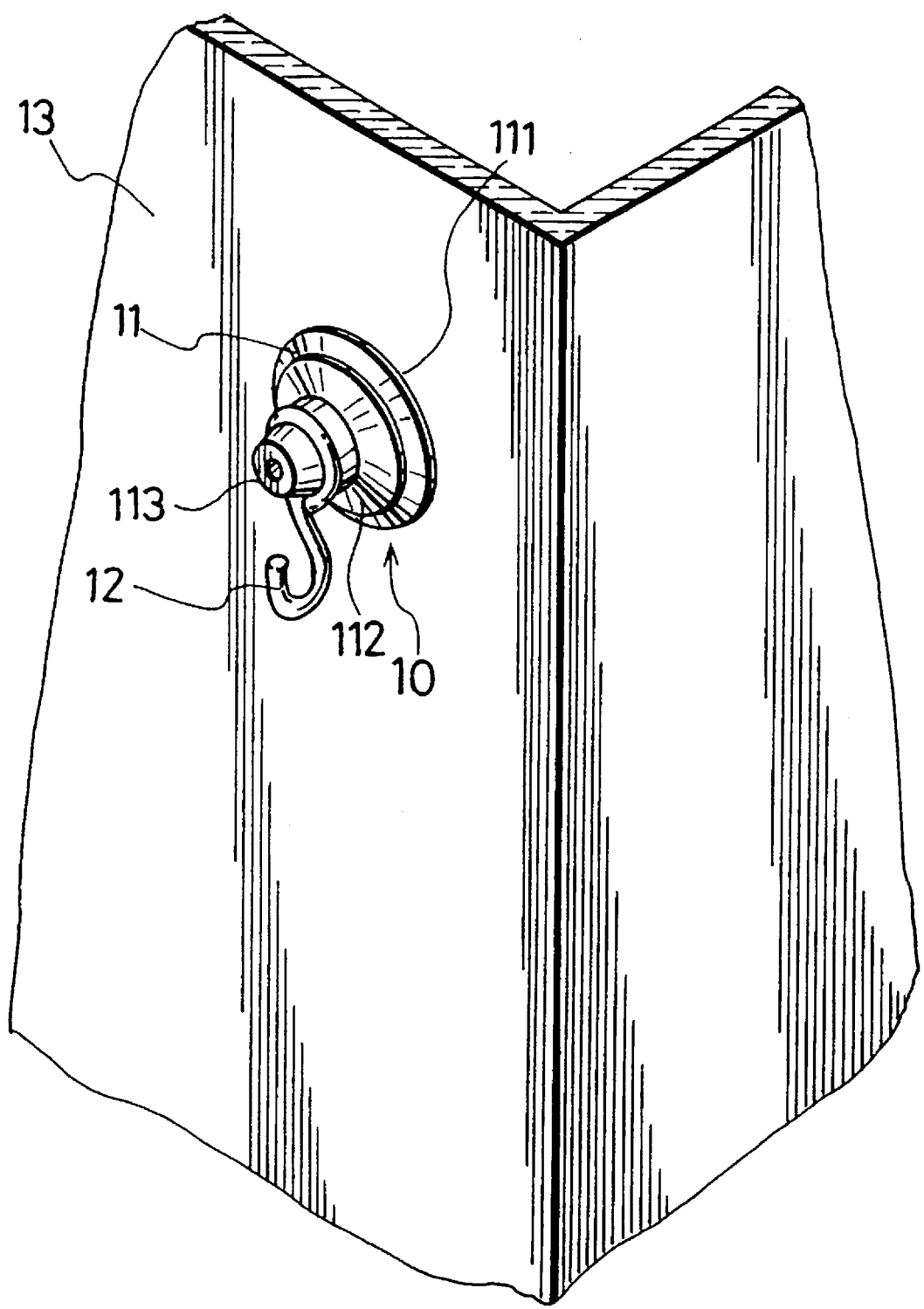
FIG. 1 illustrates a conventional suction device in use.
Figure 2:
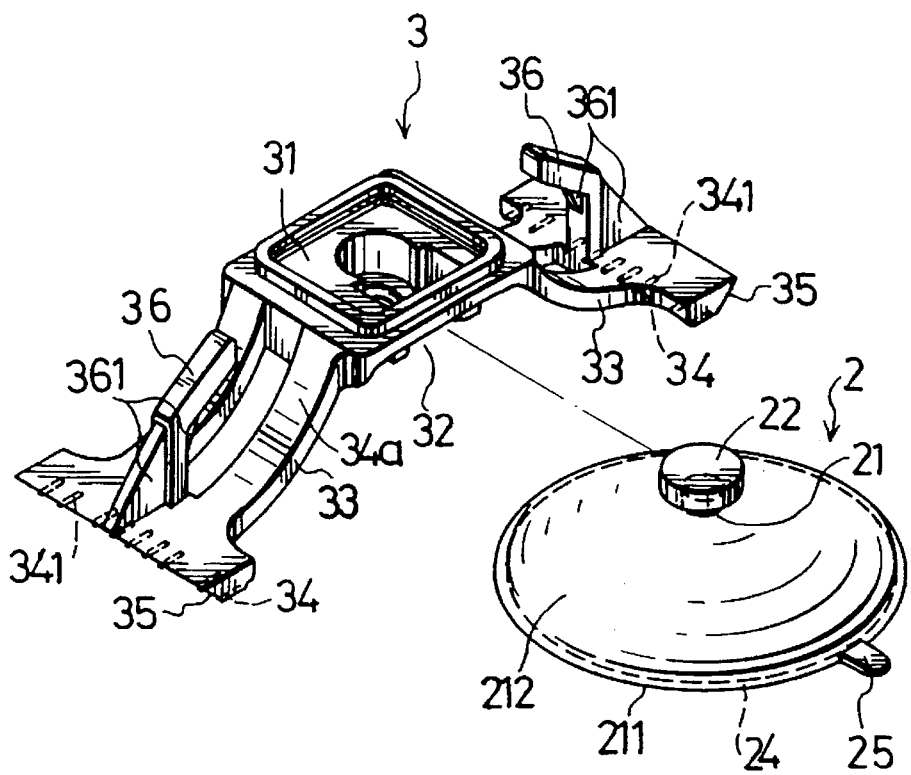
FIG. 2 is an exploded view of a suction device of the present invention.
Figure 3:
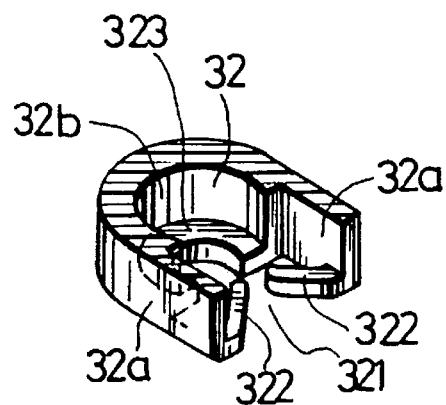
FIG. 3 shows the socket unit of a flexible hanging member employed in the suction device of the present invention.

Referring to FIGS. 2 and 3, a suction device in accordance with the present invention includes a suction cup 2 and a flexible hanging member 3.

As best illustrated in FIG. 2, the suction cup 2 has a suction face 211, a non-suction face 212 opposite to the suction face 211,.and a pivot unit constituted by a cylindrical pivot portion 21 which projects integrally from the center of the non-suction face 212 and which is formed with an enlarged end 22. The periphery 24 of the suction cup 2 is located in a plane which is spaced from the pivot unit at a predetermined distance.

The hanging member 3 includes a central portion 31 which has a socket unit 32 (see FIG. 3) at a lower portion thereof, and two curved pressing claws 33 that extend from the upper portion of the central portion 31. The socket unit 32 is a generally U-shaped member (see FIG. 3) which has two parallel arm portions 32a, a curved intermediate portion 32b interconnecting the arm portions 32a, a C-shaped flange 323 projecting inwardly from the intermediate portion 32b, and a pair of tongues 322 projecting respectively from the arm portions 32a toward the C-shaped flange 323 in such a manner that the tongues 322 cooperatively define a gap 321 therebetween which is slightly smaller than the diameter of the pivot portion 21. Each of the pressing claws 33 has a planar abutting surface 34, a mounting surface 34a (see FIG. 2), and a hook 36 attached securely on the mounting surface 34a. As best shown in FIG. 4, the planar abutting surface 34 of each of the pressing claws 33 is substantially parallel to the plane in which the periphery 24 of the suction cup 2 is located and which is spaced apart from the pivot unit at a distance that is larger than the predetermined distance. As illustrated, when the abutting surfaces 34 of the pressing claws 33 are placed on a smooth horizontal surface 37, the periphery 24 of the suction cup 2 is located above the horizontal surface 37 and the abutting surfaces 34.

During the assembly of the suction cup 2 and the hanging member 3, the pivot portion 21 is forced to push the tongues 322 away from each other so as to enter into the space that is defined between the C-shaped flange 323 and the tongues 322 of the socket unit 32. Thus, the enlarged end 22 of the pivot unit is confined rotatably in the socket unit 32 of the hanging member 3 in such a manner that the suction cup 2 is exposed to an exterior of the socket unit 32. Under this condition, the suction cup 2 is prevented from removal from the socket unit 32.

Referring to FIGS. 4 and 5, in use the suction cup 2 is pressed against the smooth horizontal surface 37 with a pressure sufficient to overcome the reaction force F1 of the suction cup 2 so as to stick the suction cup 2 on the smooth surface 37 in such a manner that the pressing claws 33 of the hanging member 3 flex and the abutting surfaces 34 of the pressing claws 33 are pressed against the smooth surface. Each of the pressing claws 33 respectively creates a pressure F2 on the smooth surface 37 such that the suction cup 2 sticks on the smooth surface 37 with a force (F) which is equal to the sum of the force F1 and the pressure F2. Thus, a relatively heavy object can be hung on the hook 36 of the suction device of the present invention.

Figure 6:
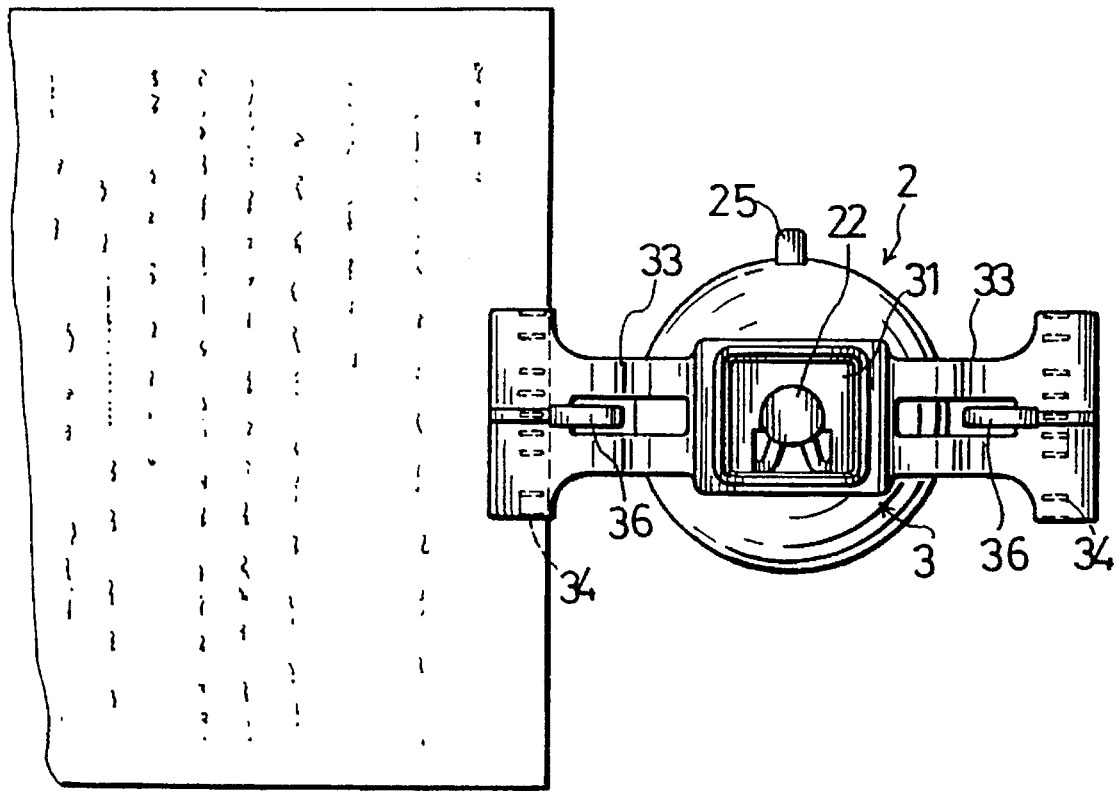
FIG. 6 illustrates how the suction device of the present invention can be used to press a sheet of paper on a smooth surface.
Figure 7:
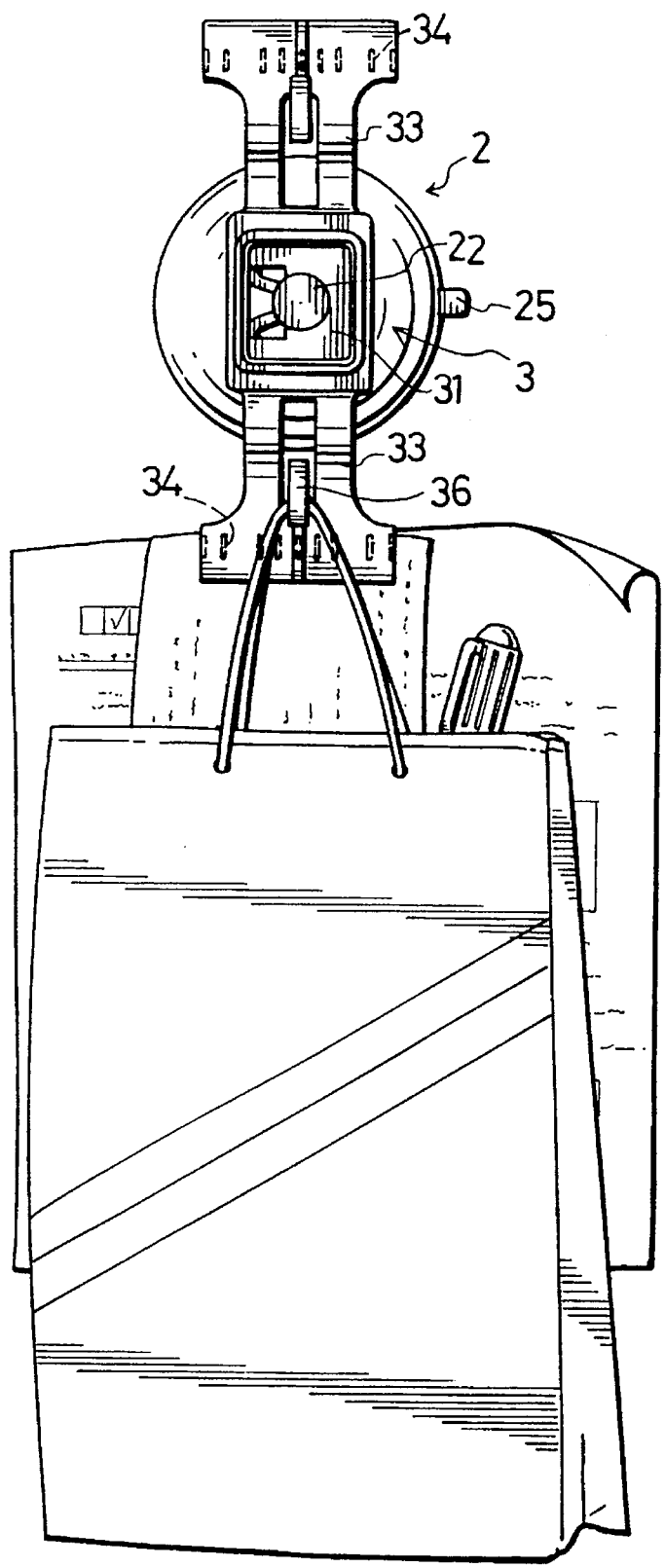
FIG. 7 illustrates how a sheet of paper is pressed by and how a bag is hung on the suction device of the present invention.

Referring to FIGS. 6 and 7, a preferred embodiment of this invention is shown to have two pressing claws 33, one of which clamps a sheet of paper between the smooth surface and the planar abutting surface 34 of the pressing claw 33. When it is desired to correct the orientation of the pressing claws 33 relative to the suction cup 2, the pressing claws 33 can be rotated to the desired position without the removal of the suction cup 2 from the smooth surface 37. A relatively heavy bag is hung on the hook 36.

The suction device of the present invention is further provided with a pull strip 25 (see FIG. 2) which projects integrally and outwardly from the periphery 24 of the suction cup 2 to facilitate removal of the suction cup 2 from the smooth surface 37 by pulling the strip 25 with one hand. The mounting surface 34a (see FIG. 2) of each of the pressing claws 33 is provided with a reinforcing rib 361 formed along the length of the mounting surface 34a. In addition, the abutting surface 34 Of each of the pressing claws. 33 has several parallel ribs 341 (see FIG. 2) projecting therefrom so as to prevent slipping of the paper between the abutting surface and the smooth surface 37. Each of the pressing claws 33 has a curved peripheral edge portion 35 (see FIG. 5) which is bent upward relative to the planar abutting surface 34 so as to facilitate in the upward lift of the abutting surface 34 to form temporarily a gap between the smooth surface 37 and the abutting surface 34 to permit insertion of the sheet of paper therebetween.

Figure 8:
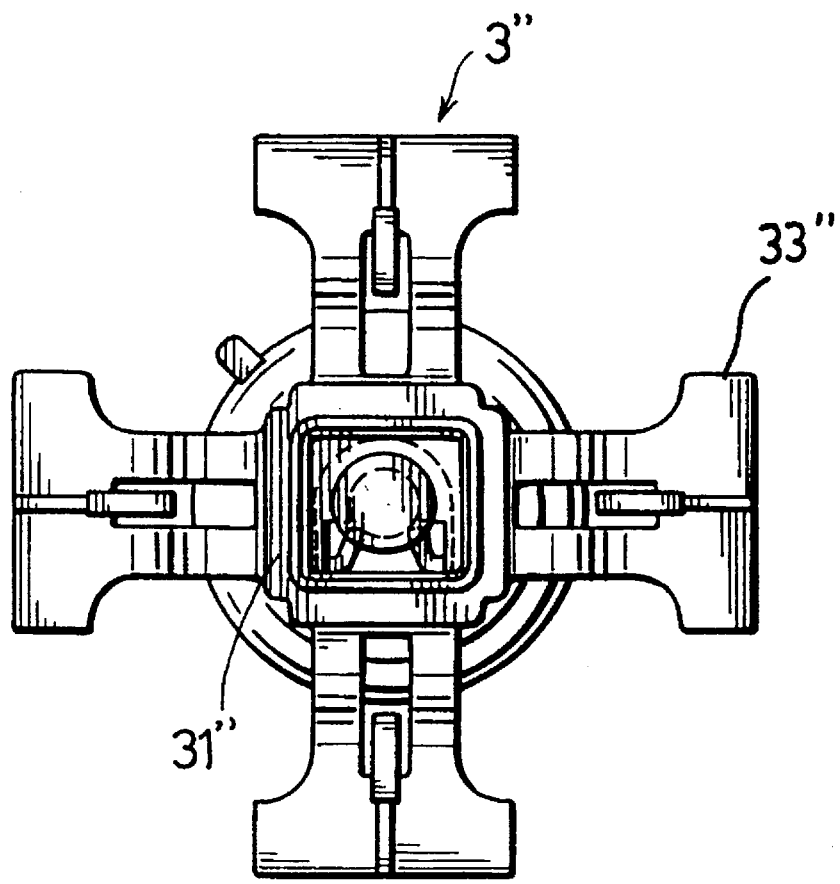
FIG. 8 shows another preferred embodiment of the suction device of the present invention.

Referring to FIG. 8, in another preferred embodiment of the present invention, the hanging member 3" has four pressing claws 33" which extend from four side portions of the central portion 31". The features and objects are the same as those of the previous embodiment.

With the present invention thus explained, it is obvious to those skilled in the art that various modifications and variation can be made without departing from the scope and spirit thereof. It is therefore intended that the present invention be limited as in the appended claims.

I claim:

1. A suction device comprising:

a suction cup having a suction face, a non-suction face opposite to said suction face, a pivot unit projecting integrally from a center of said non-suction face, and a periphery located in a plane which is spaced from said pivot unit at a predetermined distance;

a flexible hanging member including a socket unit which receives rotatably said pivot unit of said suction cup therein, and at least one pressing claw connected securely to said socket unit, said suction cup being exposed to an exterior of said socket unit, of least one said pressing claw having an abutting surface which is substantially parallel to said plane and which is spaced apart from said pivot unit at a distance that is larger than said predetermined distance, and a mounting surface opposite to said abutting surface, said pressing claw further having a hook attached to said at least one mounting surface for hanging an object thereon, said suction cup being capable of being pressed against a smooth surface so as to stick the suction device on the smooth surface in such a manner that said pressing claw of said at least one hanging member flex and that said abutting surface surfaces of said pressing claw is pressed against the smooth surface, thereby permitting a sheet of paper to be clamped between the abutting surface of said at least one of the pressing claw and the smooth surface; and wherein said pivot unit includes a cylindrical pivot portion projecting from said non-suction face and provided with an enlarged end, said socket unit being U-shaped and being provided with two parallel arm portions and a curved intermediate portion interconnecting said arm portions, said socket unit further having a C-shaped flange projecting inwardly from said curved intermediate portion, and a pair of tongues projecting respectively from said arm portions toward said C-shaped flange in such a manner that said tongues cooperatively define a gap therebetween which is slightly smaller than diameter of said pivot portion and which confines said pivot portion in a space that is defined between said C-shaped flange and said tongues so that said pivot unit is prevented from removal from said socket unit, whereby, during assembly of said suction cup and said hanging member, said pivot portion can be forced to push said tongues away from each other in order to move into said space.

2. A suction cup having a suction face, a non-suction face opposite to said suction face, a pivot unit projecting integrally from a center of said non-suction face, and a periphery located in a plane which is spaced from said pivot unit at a predetermined distance;

a flexible hanging member including a socket unit which receives rotatably said pivot unit of said suction cup therein, and a plurality of pressing claws connected securely to said socket unit, said suction cup being exposed to an exterior of said socket unit, each of said pressing claws having an abutting surface which is substantially parallel to said plane and which is spaced apart from said pivot unit at a distance that is larger than said predetermined distance, and a mounting surface opposite to said abutting surface, each of said pressing claws further having a hook attached to said mounting surface for hanging an object thereon, said suction cup being capable of being pressed against a smooth surface so as to stick the suction cup on the smooth surface in such a manner that said pressing claws of said hanging member flex and that said abutting surfaces of said pressing claws are pressed against the smooth surface, thereby permitting a sheet of paper to be clamped between the abutting surface of one of the pressing claws and the smooth surface; and wherein said pivot unit includes a cylindrical pivot portion projecting from said non-suction face and provided with an enlarged end, said socket unit being U-shaped and being provided with two parallel arm portions and a curved intermediate portion interconnecting said arm portions, said socket unit further having a C-shaped flange projecting inwardly from said curved intermediate portion, and a pair of tongues projecting respectively from said arm portions toward said C-shaped flange in such a manner that said tongues cooperatively define a gap therebetween which is slightly smaller than diameter of said pivot portion and which confines said pivot portion in a space that is defined between said C-shaped shaped flange and said tongues so that said pivot unit is prevented from removal from said socket unit, whereby, during assembly of said suction cup and said hanging member, said pivot portion can be forced to push said tongues away from each other in order to move into said space.

3. The suction device as defined in claim 2, wherein said suction cup has a pull strip projecting integrally and outwardly from the periphery so as to facilitate removal of said suction cup from the smooth surface by hand.

4. The suction cup device as defined in claim 2, wherein said abutting surface of each of said pressing claws has several parallel ribs projecting therefrom so as to prevent slipping of the sheet of paper between said abutting surface and said smooth surface.

* * * * *